United States Patent

Hehl et al.

[11] Patent Number: 5,945,046
[45] Date of Patent: Aug. 31, 1999

[54] PROCESS FOR REGULATING THE TOOL INNER PRESSURE CURVE OF A CYCLICALLY WORKING MACHINE

[75] Inventors: Karl Hehl, Lossburg; Oliver Kay Wybitul, Baesweiler; Michael Manfred Gierth, Aachen; Joachim Huth, Solingen, all of Germany

[73] Assignee: Arburg GmbH + Co., Germany

[21] Appl. No.: 09/051,069

[22] PCT Filed: Oct. 2, 1996

[86] PCT No.: PCT/DE96/01895

§ 371 Date: Jun. 11, 1998

§ 102(e) Date: Jun. 11, 1998

[87] PCT Pub. No.: WO97/12740

PCT Pub. Date: Apr. 10, 1997

[30] Foreign Application Priority Data

Oct. 2, 1995 [DE] Germany ............. 195 36 566

[51] Int. Cl.$^6$ ............. B29C 45/76; B29C 45/77
[52] U.S. Cl. ............. 264/40.1; 264/40.5; 264/40.7; 425/145; 425/149
[58] Field of Search ............. 264/40.1, 40.5, 264/40.7, 328.1; 425/145, 146, 149, 150; 364/475.05, 475.08

[56] References Cited

U.S. PATENT DOCUMENTS

| 3,642,404 | 2/1972 | Nagawa | 425/145 |
| 3,859,400 | 1/1975 | Ma | 425/145 |
| 4,325,896 | 4/1982 | Rodgers, Jr. | 264/40.1 |
| 5,164,202 | 11/1992 | Beyer et al. | 425/149 |
| 5,356,575 | 10/1994 | Krosse et al. | 264/40.1 |
| 5,578,256 | 11/1996 | Austin | 264/40.1 |
| 5,645,775 | 7/1997 | Spahr et al. | 264/40.5 |
| 5,665,283 | 9/1997 | Bader et al. | 264/40.1 |

FOREIGN PATENT DOCUMENTS

| 0 233 548 | 8/1987 | European Pat. Off. |
| 0 495 266 | 7/1992 | European Pat. Off. |
| 0 536 448 | 4/1993 | European Pat. Off. |
| 0 536 449 | 4/1993 | European Pat. Off. |
| 0 707 936 | 4/1996 | European Pat. Off. |
| 30 21 978 | 2/1981 | Germany |
| 36 39 292 | 5/1988 | Germany |
| 41 40 392 | 2/1997 | Germany |
| 57-142337 | 9/1982 | Japan |

OTHER PUBLICATIONS

Ries et al, "Druckübertragung beim Spritzgiessen durch verbessertes Umschalten aug Nachdruck", Kunststoffe, vol. 77, Dec. 1987, pp. 1232–1236.

*Primary Examiner*—Jill L. Heitbrink
*Attorney, Agent, or Firm*—Venable; George H. Spencer; Robert Kinberg

[57] ABSTRACT

For a cycle of a cyclically operating machine, the internal tool pressure is detected during the cycle as a function of the time and/or as a function of the path traversed by the conveying means. The internal tool pressure course is then differentiated as a function of the time or of the path. It is then checked whether, by way of the previously determined derivatives, there are deviations from a monotonic course. If this is the case, the holding pressure time or the change-over moment are changed until the internal tool pressure curve has a monotonic course.

18 Claims, 8 Drawing Sheets

PROCESS FOR REGULATING THE TOOL INNER PRESSURE CURVE OF A CYCLICALLY WORKING MACHINE

DESCRIPTION

REFERENCE TO RELATED APPLICATIONS

The present application claims the priority of German Patent Application 195 36 566.6, filed on Oct. 2, 1995, the disclosure contents of which is herewith also explicitly made the subject matter of the present application.

TECHNICAL FIELD

The invention relates to a method of controlling an internal tool pressure on a cyclically operating machine.

The method can preferably be used in the plastics-processing and metal-working industries, for example, in conjunction with plastics injection molding machines, blow molding machines, die-casting machines, aluminum die-casting machines, but also in conjunction with presses or welding apparatuses provided that cyclically operating processes are carried out. In so far as process curve courses are discussed in the following text, this covers not only courses that can be detected directly but also those process curve courses that can be calculated from the detected courses such as, for example, derivatives, integrals and the like.

STATE OF THE TECHNOLOGY

EP-A 233 548 discloses a method to detect the process curve courses of the hydraulic pressure in a cycle-synchronous manner. In order to attain a change-over point control between compression and holding pressure phase, specific criteria are established that are checked by way of the hydraulic pressure course. It is checked, for example, that the pressure for the change-over to holding pressure is reached only once, that the pressure course does not contain any overshooting and no pressure peak; but all of these checks are not carried out by way of the internal tool pressure. The drawback of this procedure which focuses on the hydraulic pressure, however, is that this pressure is setting-dependent and machine-dependent and is therefore difficult to evaluate. A control of the holding pressure time including corresponding criteria cannot be found in this disclosure.

DE-A 30 21 978 describes a method of controlling the internal tool pressure course on a cyclically operating machine, with the internal tool pressure course as well as the hydraulic pressure course being monitored as decision criteria for the determination of the change-over point. To accomplish a pressure shock-free change-over from the injection phase to the holding pressure phase and from the latter to the setting phase, the hydraulic pressure is controlled as soon as the actual value of the tool pressure reaches the desired starting value of the holding pressure phase, and an actual value of the pressure is predetermined at the transfer point as desired starting value of the setting phase. While this permits the transition of the internal tool pressure from one into another, it does not yet ensure a harmonic continuous pressure course.

SUMMARY OF THE INVENTION

Starting from this state of the technology, it is an object of the present invention to optimize and monitor the cycle on machines of this type so that high-quality parts are produced.

The above and other objects are accomplished according to the invention by the provision of a method of controlling a course of an internal tool pressure on a cyclically operating machine, comprising the steps of:
 a) filling of a mold cavity with a conveyable material by a conveying means,
 b) applying a pressure to compress the conveyed material while the filling of the mold cavity continues,
 c) applying a holding pressure during a molding of a product in the mold cavity,
 d) reducing the pressure and removing the product,
 e) detecting the course of the internal tool pressure (Pwi) at least as a function of time (t), which course occurs as a result of the pressure in steps a) to d),
 f) differentiating the course of the internal tool pressure (Pwi) at least twice as a function of time (t) to determine a second order derivative,
 g) by way of the derivative determined in step (f), checking the course of the internal tool pressure (Pwi) for presence of an extreme value $(\max(dPwi/dt)^2)$ of the second order derivative at least in a transition region between the regions of the internal tool pressure courses resulting from steps b) to c),
 h) changing a change-over time $(t_{um})$ of a transition between steps b) and c) when an extreme value of the second order derivative occurs in step g), and
 i) repeating steps a) to h) until the second order derivative no longer show an extreme value in the transition region.

According to yet another embodiment of the invention there is provided a method of controlling a course of an internal tool pressure on a cyclically operating machine, comprising the steps of:
 a) filling of a mold cavity with a conveyable material by a conveying means,
 b) applying a pressure to compress the conveyed material while the filling of the mold cavity continues,
 c) applying a holding pressure during a molding of a product in the mold cavity,
 d) reducing the pressure and removing the product,
 e) detecting the course of the internal tool pressure (Pwi) at least as a function of a path traversed by the conveying means, which course occurs as a result of the pressure in steps a) to d),
 f) differentiating the course of the internal tool pressure (Pwi) at least twice as a function of the path to determine a second order derivative,
 g) by way of the derivative determined in step (f), checking the course of the internal tool pressure (Pwi) for the presence of an extreme value $(\mathrm{Max}(dPwi/ds)^2)$ of the second order derivative at least in a transition region between the internal tool pressure courses resulting from steps b) to c),
 h) changing a change-over point of the path traversed by the conveying means up to a transition between steps b) and c) when an extreme value of the second order derivative occurs, and
 i) repeating steps a) to h) until the second order derivative no longer shows an extreme value in the transition region.

According to a still further embodiment of the invention there is provided a method of controlling a course of an internal tool pressure on a cyclically operating machine, comprising the steps of:
 a) filling of a mold cavity with a conveyable material by a conveying means, b) applying a pressure to compress the conveyed material while the filling of the mold cavity continues, c) applying a holding pressure during a molding of the product in the mold cavity, d) reducing the pressure and removing the product, e) detecting the course of the internal tool pressure (Pwi) at least as a function of time (t), which course occurs as a result of the pressure in steps a) to d), f) differentiating the course of the internal tool pressure (Pwi) at least one time as a function of the time (t), g) by way of the derivative determined in step (f), checking the course of the internal tool pressure (Pwi) for presence of a constant slope at least in regions of the internal tool pressure courses resulting from steps c) to d), h) when a non-constant descending course occurs in step g), changing a holding pressure time ($t_n$) up to a transition between steps c) and d), i) repeating steps a) to h) until a constantly descending course appears in step f).

The internal tool pressure course is checked with the assistance of differential calculus. For this purpose, this internal tool pressure course is recorded during the different phases of a cycle. If the goal is an optimum change-over point between injection phase and holding pressure phase, the curve is checked for a monotonic slope (i.e. linear gradient). If there is no monotonic course, the time periods up to or the path up to the change-over point are changed until an optimum change-over point is determined. If the goal is an optimum holding pressure time up to the sealing of the sprue, the curve is checked for a constant drop in a region of the end of the holding pressure, that is, to ensure that the curve does not have a kink difference or slope difference between adjacent points. The holding pressure time can also be optimized. In this manner, the cycle time can be optimized without loss of quality.

DETAILED DESCRIPTION OF PREFERRED EMBODIMENTS

The invention is now described by way of example with reference to the attached drawings in greater detail. The embodiments, however, are merely examples which are not intended to limit the concept of the invention to a specific physical arrangement.

The method and the arrangement required therefor are explained below by way of an injection molding machine, preferably an injection molding machine for the processing of plastic compounds such as plastic materials or powdered compounds. But, as was mentioned at the outset, the method can also be used without any problems in other fields in which cyclically occurring processes are used for the production (molding) or processing (forming) of products.

The method serves to control the internal tool pressure course on a cyclically operating machine. It is based on the fact that it turns out the internal tool pressure Pwi is best suited to display discrepancies when it comes to making optimum high-quality products. With these machines, the production sequence of the products is approximately like the sequence described in detail below for an injection molding machine.

Figure 5:
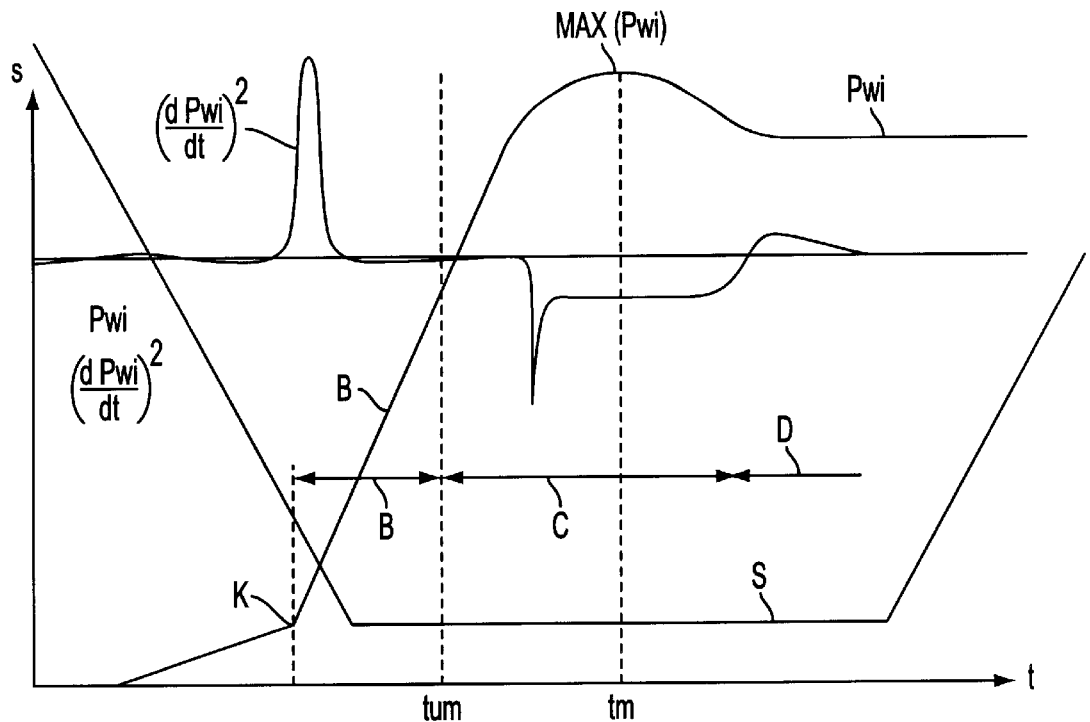
FIGS. 5, 6 are digrams which show the internal tool pressure course, the screw stroke as well as the course of the derivative of the second order with regard to the internal tool pressure as a function of the time for determining a change-over point for an optimum change-over point and a premature change-over.
Figure 6:
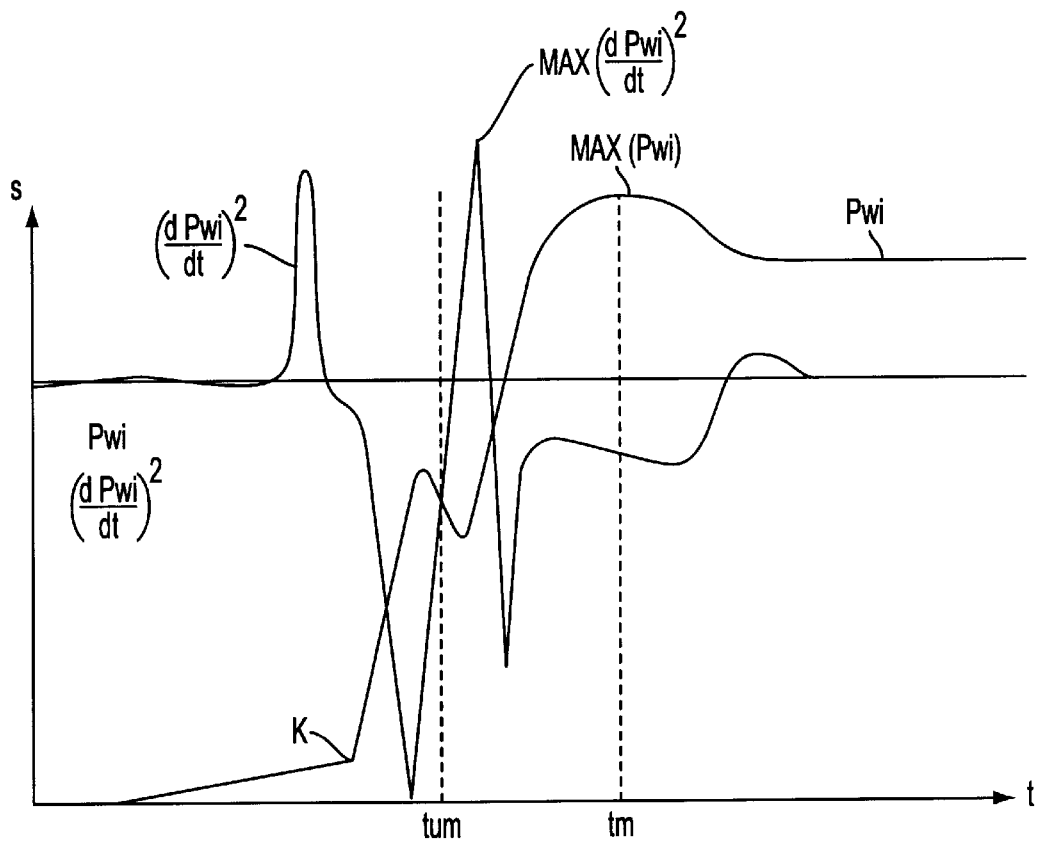
Figure 9:
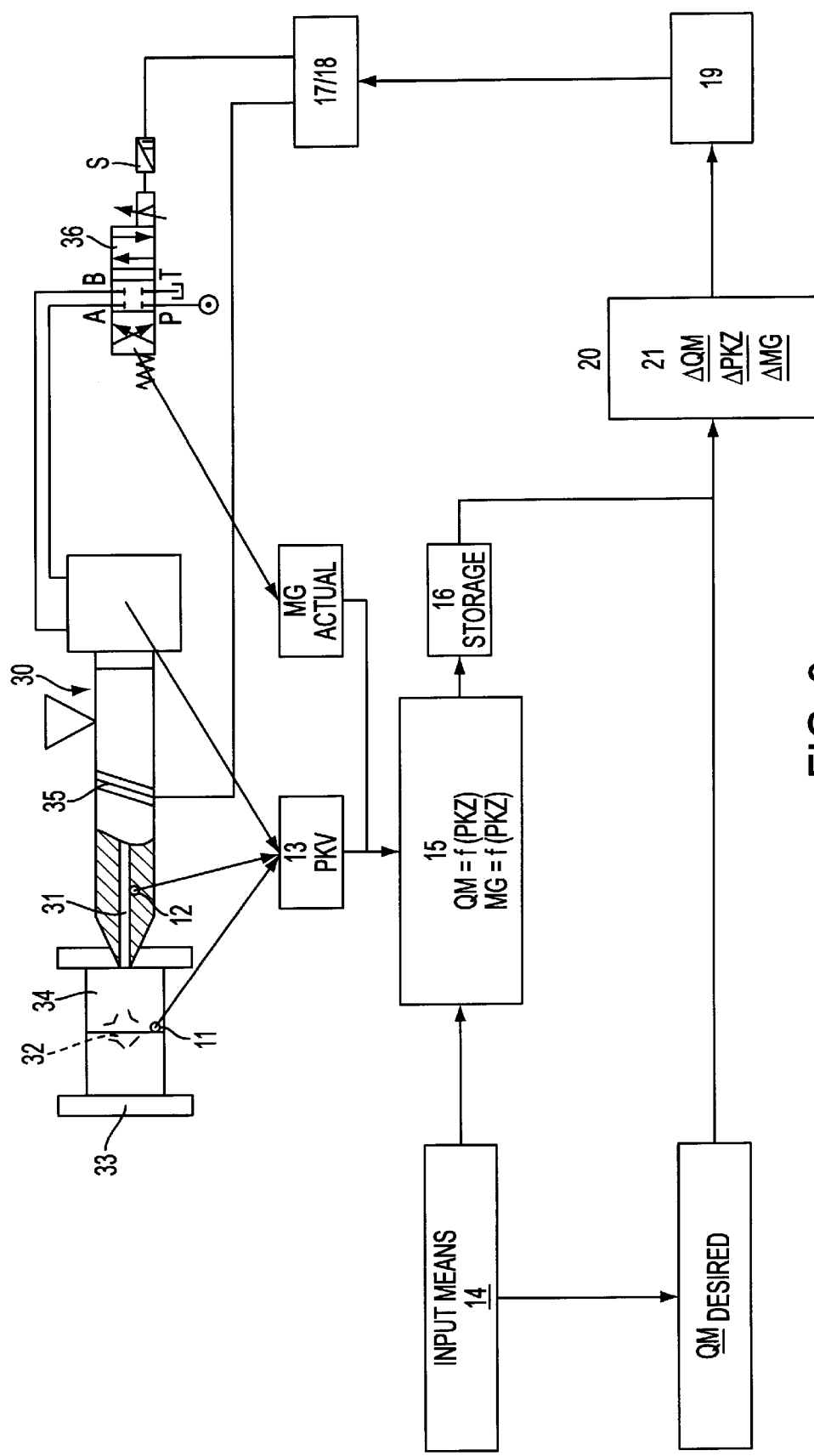
FIG. 9 is a schematic and partial block digram showing the elements provided on a plastics injection molding machine.

Referring to FIG. 9, an injection means 31 of an injection molding unit such as, for example, a conveying screw or an injection plunger inject material into a mold cavity 32 of an injection mold 34 in a mold closing unit 33. The arrangement is provided with sensor means such as, for example, an internal tool pressure sensor 11 and a temperature sensor 12 in the region of the injection molding unit. When the conveying means is moved, the mold cavity is first filled gradually; during this process, the internal tool pressure at first starts rising very gradually according to FIG. 1. If the internal tool pressure sensor is not arranged in the proximity of a sprue, a delayed start of the process curve course can also occur, as is illustrated in FIGS. 5 and 6. But it is preferred that the internal tool pressure sensor 11 is arranged in the proximity of the sprue because otherwise problems might arise with regard to the detection of the internal tool pressure Pwi, at least in thin-walled parts. The mold cavity is now filled at the level of the kink U$n$ in the internal tool pressure curve Pwi. The conveying means, however, continues to operate to press still more material into the mold cavity during a compression phase. At this moment, the conveying means 31 reaches a point at which a further forward movement in the direction of the mold cavity is no longer possible, so that a path or velocity control can no longer take place. The change-over to a pressure control takes place at this change-over time $t_{um}$ and a holding pressure control begins, which corresponds approximately with region C shown in FIG. 5.

The moment of the change-over set on a machine determines, e. g., when a change-over takes place from the velocity-controlled injection to the pressure-controlled holding pressure region. The change-over point should correspond, if possible, with the volumetric filling of the mold cavity 32 because the mold cavity is intended to be filled at a defined velocity, but the shrinkage occurring in the holding pressure phase must be compensated for by a predetermined pressure profile. However, at the change-over point, pressure fluctuations and pressure peaks must be avoided, if possible, so that a continuous and harmonic transition occurs between injection phase and holding pressure phase and that the quality of the molding cannot be impaired by negative influences.

Then there also occurs a maximum Max(Pwi) of the internal tool pressure Pwi in region C of the holding pressure. Once the maximum is exceeded, the pressure gradually drops during the cooling of the molding. Here, it is now decisive to determine when the molding is sealed in the tool. This moment must be equated with an optimum holding pressure time. If the holding pressure time is set to be too long, it may become the magnitude which determines the cycle time and may therewith reduce the productivity and efficiency of the process. But if it is too short, the molding is not sealed and melt flows out of the tool. This loss of mass impairs the quality of the moldings and their reproducibility.

Figure 1:
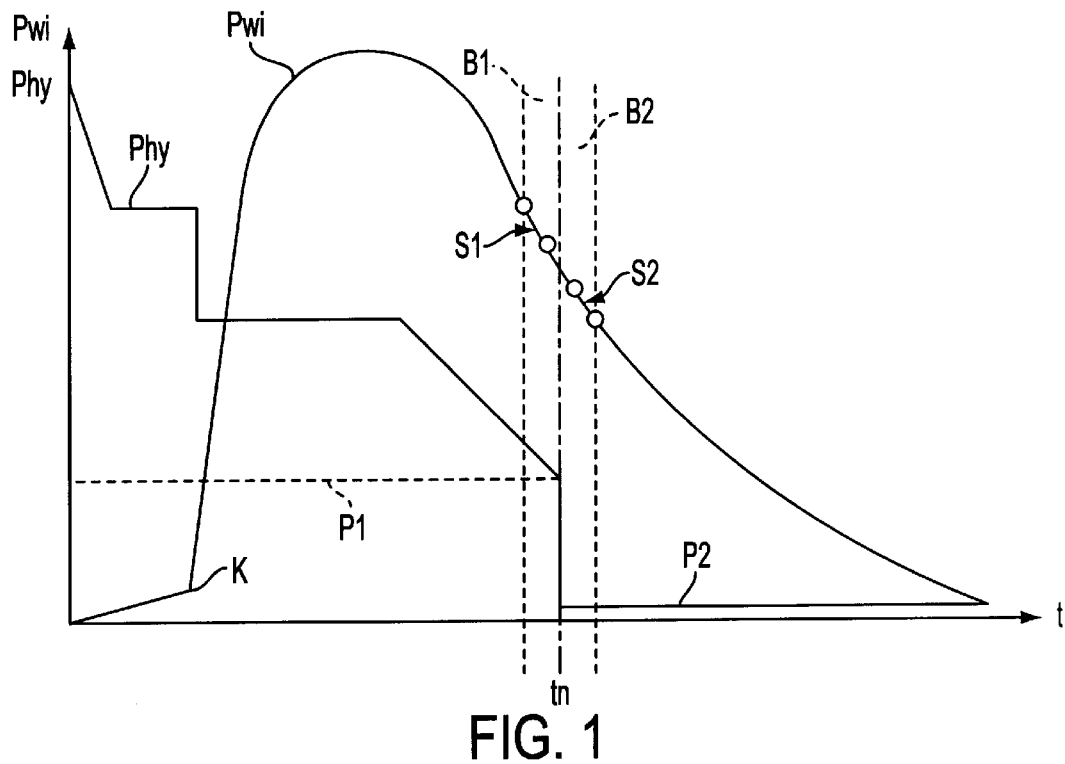
FIGS. 1, 2 are digrams showing the internal tool pressure course and the hydraulic pressure course for a sufficient holding pressure time and a holding pressure time that is too short and for a semi-crystalline material.
Figure 2:
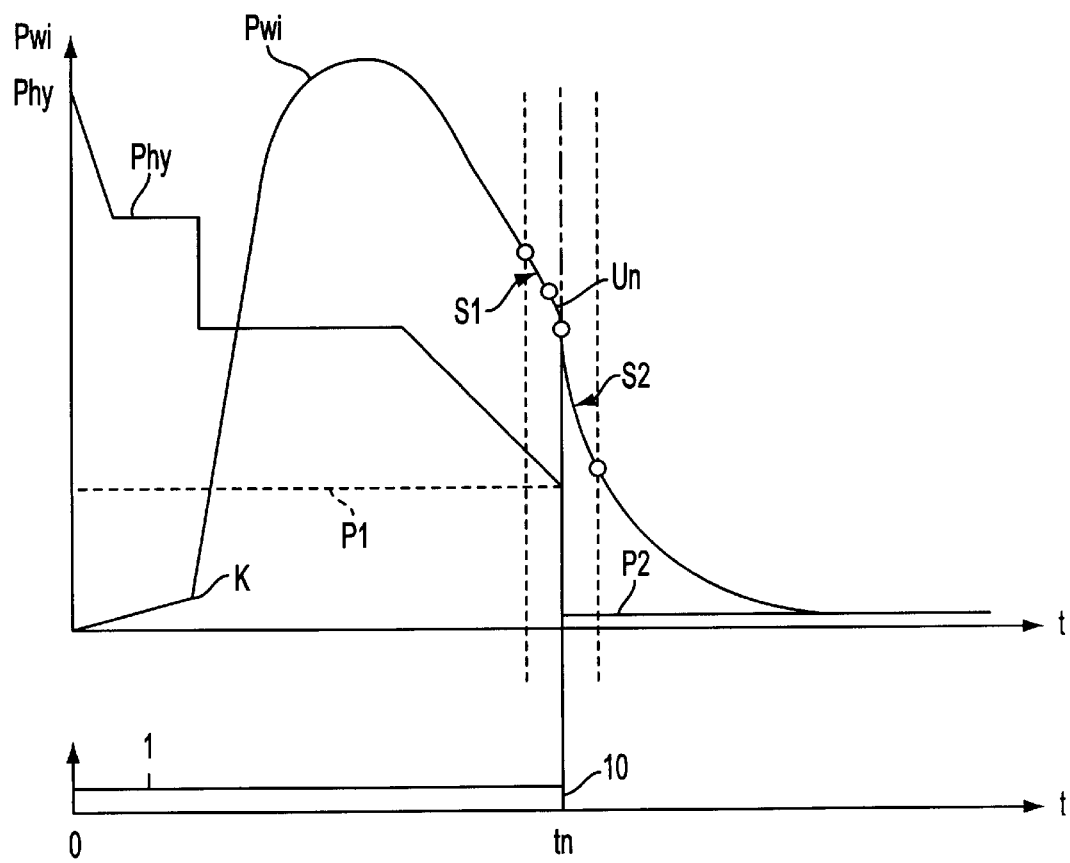
Figure 3:
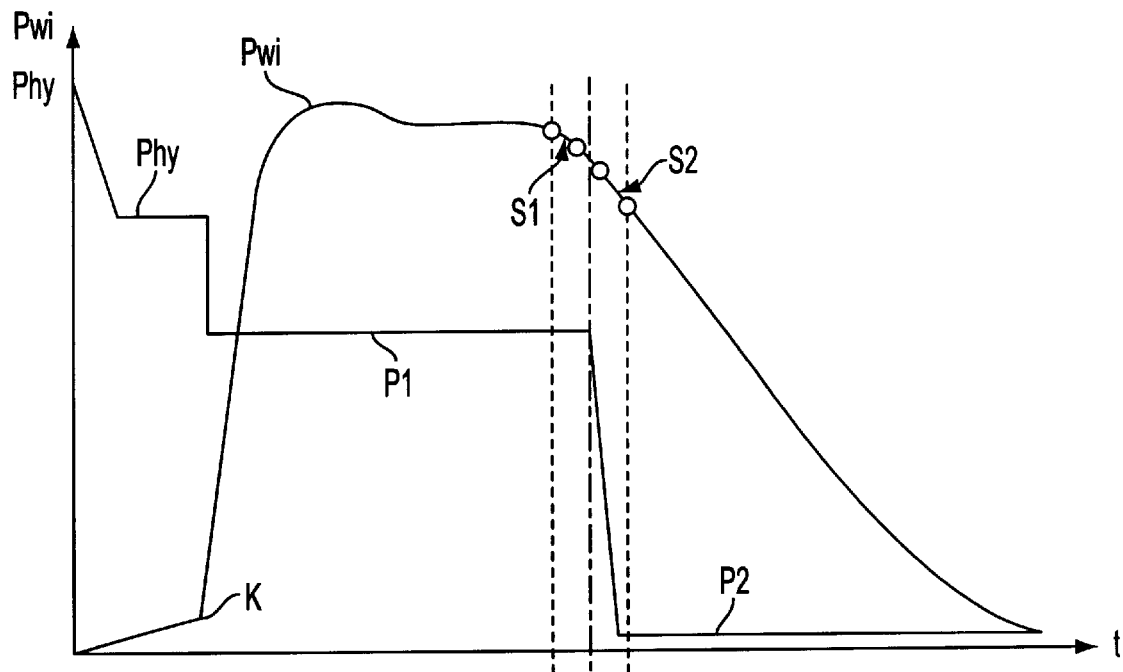
FIGS. 3, 4 are diagrams showing curves according to FIGS. 1, 2 When an amorphous material is used.
Figure 4:
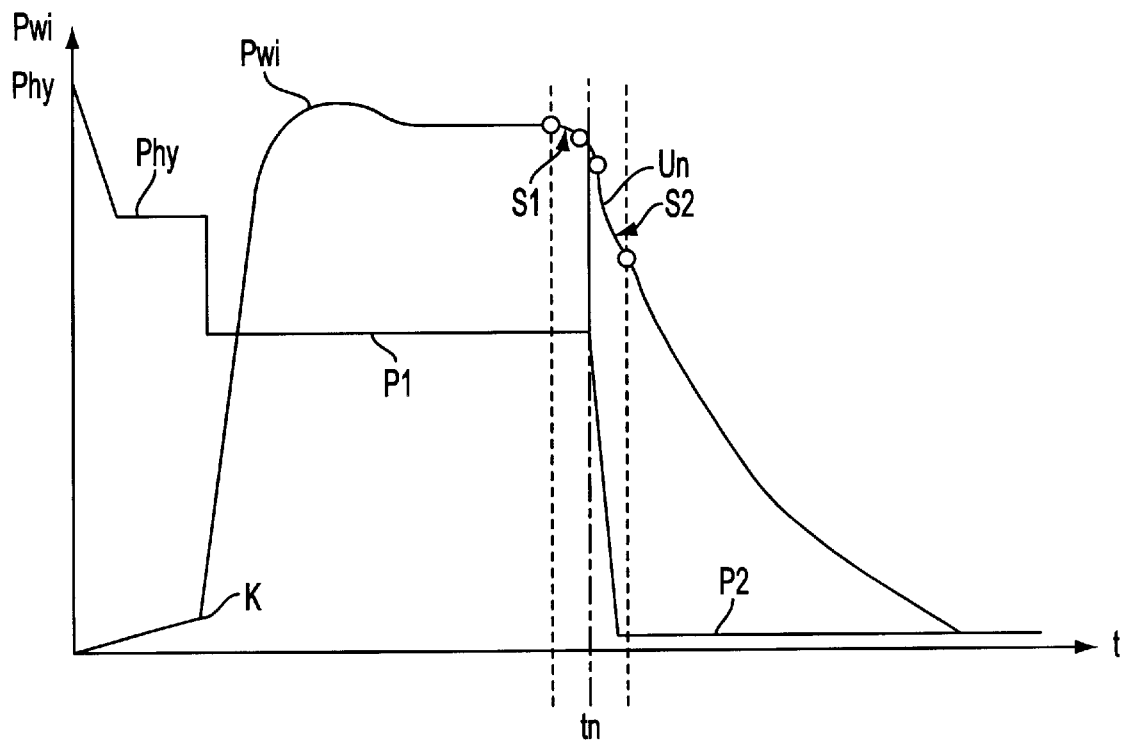

FIGS. 1 and 2 differ from FIGS. 3 and 4 in that an amorphous material is processed in FIGS. 3 and 4, whereas semi-crystalline material is processed in FIGS. 1 and 2. Since the forming of the product takes a rather long time in the case of the amorphous material, the internal tool pressure Pwi must also be maintained for a longer time period.

The hydraulic pressure Phy is also plotted in FIGS. 1–4. It is understood that this hydraulic pressure can be used on a hydraulic machine as setting magnitude for the internal tool pressure, but that a similar picture emerges when other drives such as, e.g., electromechanical drives are used, in which cases the hydraulic pressure Phy is then replaced by a force course. The hydraulic pressure is high in the beginning of the filling phase in order to accomplish a filling of the mold cavity 31 as quickly as possible. In the holding pressure phase, the hydraulic pressure then is at a level P1 from which it drops to a level P2 at the end of the holding pressure time.

Figure 7:
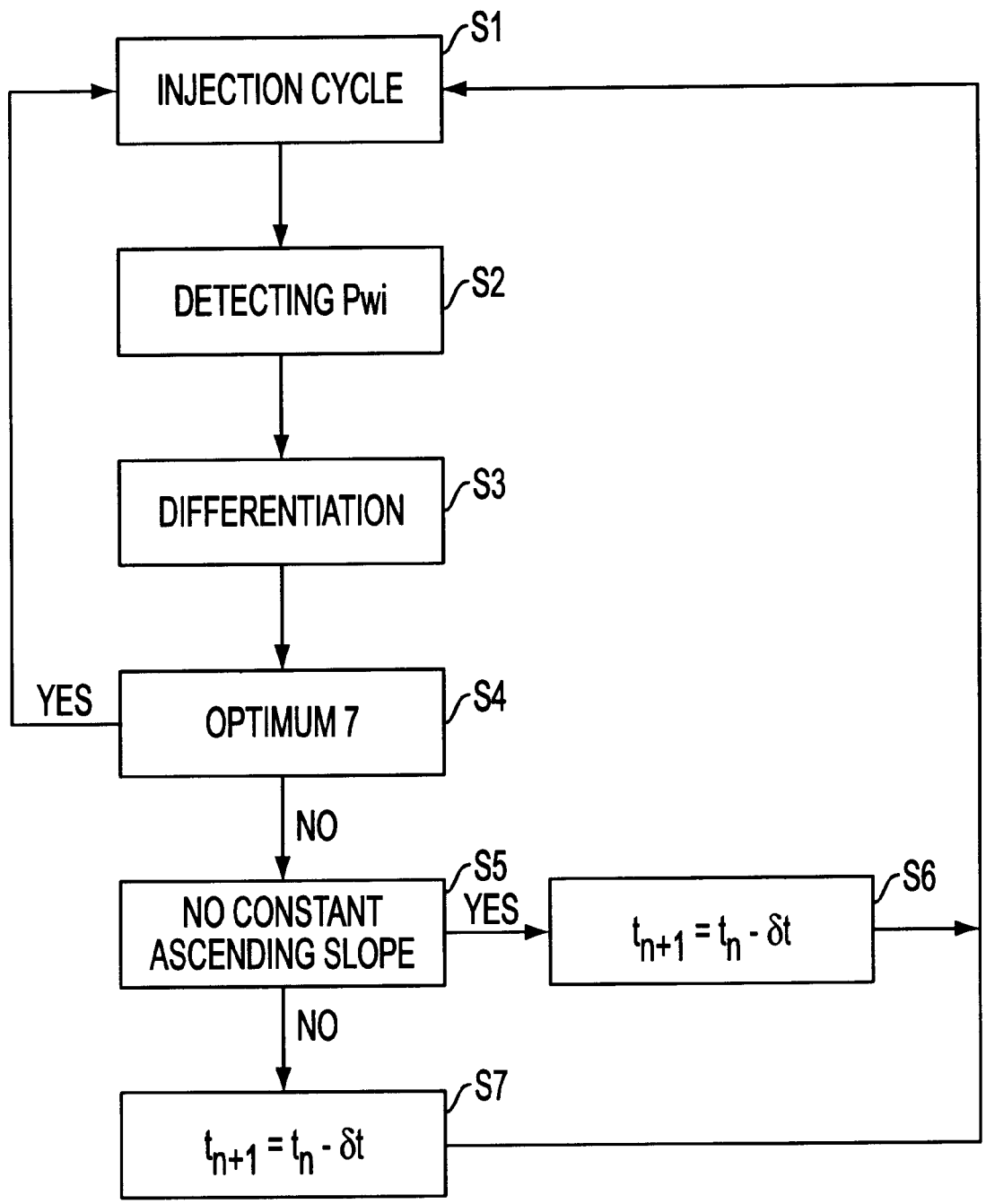
FIG. 7 is a flow chart showing the method sequence in the form of a block diagram for determining an optimum holding pressure time.

Referring additionally to FIG. 7, the process curve courses discussed so far, but also those illustrated in FIGS. 5 and 6, are now detected during the implementation of an injection cycle according to step S1 at least as a function of the time t and/or as a function of the path s traversed by the conveying means 31 according to step S2. With means of differential calculus, the process curve courses, but substantially the internal tool pressure courses, are differentiated as a function of the time t or of the path s according to step S3. Then a check takes place in step S4 as to whether a monotonic or constant slope can be determined by way of the derivatives of the first, second and third order that were determined. If the optimum has not yet been reached, it is checked in step S5 in FIG. 7, which represents an example of a controller for the holding pressure time, whether a constant slope, that is, e.g., a kink, is not present, as is illustrated, for example, in FIGS. 2 and 4. In the absence of a constant ascending slope, more precisely of a constant drop, the holding pressure time $t_n$ is increased in the example of FIG. 7 to be $$t_n+1=t_n+\delta t.$$

This is intended to accomplish that the drop of the internal tool pressure, which results from a premature pressure reduction of the holding pressure as a consequence of escaping material, is prevented during the next injection cycle (step S6). The next injection cycle is then carried out with the changed holding pressure time $t_n$ and, if an optimum already emerges, only steps S1 to S4 are carried out after that.

But a constantly dropping course in this region is also brought about if the holding pressure time $t_n$ is selected to be too long. For this reason, a control can be provided to the extent that a further change of the holding pressure time $t_n$ is carried out, even if it turns out in step S5 that a constant slope is present. In this case, the holding pressure time $t_n$ is now changed according to step S7 to be $$t_n+1=t_n-\delta t.$$

This means that the holding pressure time is reduced and the next injection cycle takes place. This reduction of the holding pressure time takes place until a constant slope again does not take place. If the holding pressure time is now increased slightly, an optimum holding pressure time $t_n$ is brought about.

This control of the holding pressure time $t_n$ can first be carried out in that a plurality of points along the internal tool pressure course is checked; and in the absence of a constant slope in a closed loop control system, the holding pressure time $t_n$ is controlled to a value at which a constant slope just no longer occurs. For this check, the internal tool pressure course Pwi is differentiated once as a function of the time t, and the value S1 of the slope in a region B1 upstream of the point $t_n$ and the value S2 in a region B2 downstream of the point are determined. If the result of the division of the value S1 by the value S2 is a value of approximately 1, then a continuity exists.

But the search algorithm for finding a kink Un can be accelerated if the checking takes place, e.g., starting from the point at which the digital signal "end of holding pressure" 10 is generated in FIG. 2. As an alternative to the digital signal "end of holding pressure", the negative edge in the hydraulic pressure Phy at the end of the holding pressure can also be used. At the end of the holding pressure, the hydraulic pressure Phy drops from a high pressure level P1 to a low level P2. The drawback of this procedure is that both pressure levels are setting-dependent and machine-dependent and it is therefore more difficult to evaluate them. Alternatively, the digital signal "end of holding pressure" can be determined through the digital signal "open tool" and the value of the machine setting magnitude "remaining cooling time" because the moment at the end of the holding pressure corresponds to the moment "open tool" minus the remaining cooling time. The holding pressure time can thus be controlled according to the controller equation:

$$\Delta t_n = -((S1/S2) - \text{desired value}) \times \text{amplification factor.}$$

Figure 8:
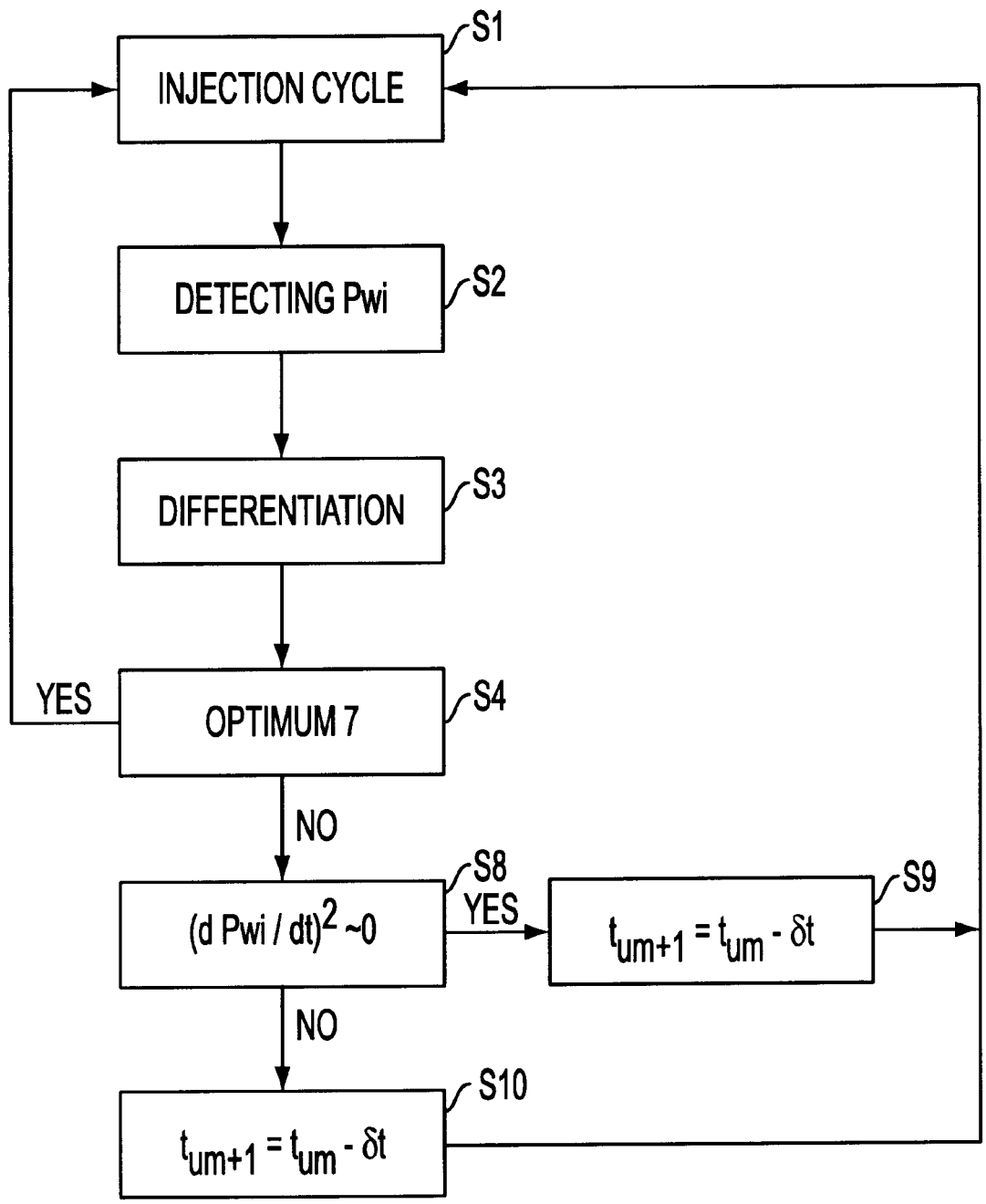
FIG. 8 is a flow chart showing the method sequence by way of a block diagram for determining an optimum change-over moment.

It is also possible to control the change-over point with a similar algorithm; therefore, the following makes reference to FIGS. 5, 6 and 8. In FIGS. 5 and 6, the internal tool pressure Pwi, on the one hand, and its derivative of the second order, on the other hand, are plotted in each case over time. Since the derivative of the internal tool pressure Pwi can also take place as a function of the path traversed by the conveying means 31, FIG. 11 thus shows a representation that can be compared with FIG. 5. In the following, the otherwise identical control algorithm is illustrated by way of the time-dependent differentiation.

FIG. 5 shows a correct change-over wherein a monotonic or strictly monotonicly ascending course of the internal tool pressure curve is brought about in the region of the change-over point $t_{um}$. The situation is different in FIG. 6 where a premature change-over takes place which consequently results in a pressure collapse which is reflected in extreme values, that is, maximum and minimum values of the derivatives. If the change-over point is not correct, a marked local maximum as well as an associated local minimum of the second derivative of the internal pressure usually appear. The criterion is whether the derivative of the second order has an extreme value. Controlling takes place for a state of the change-over which is not quite perfect. The error of a slightly premature change-over is necessary since, otherwise, there is no criterion to determine when the change-over occurs too late. The use of the derivative of the second order of the internal tool pressure leads to the fact that a very small error during the change-over suffices to arrive at only a detectable slight delay but not at the stopping of the screw. If the same were attempted with the first derivative of the internal tool pressure, only a zero passage could serve as a characteristic value. But this presupposes a pressure collapse, that is, not only a temporary deceleration of the pressure rise. But this is usually not without effect on the molding.

It was already explained in the beginning why the derivative of the second order is advantageous compared to the first derivative. If previously an optimum was not achieved, which can only be determined by way of a comparison after at least two injection cycles, it is examined in step S8 (see FIG. 8) whether $$(dPwi/dt)^2 \sim 0.$$

If this is not the case, the change-over moment $t_{um}$ is increased by δt in accordance with step S10. If, however, a value in a magnitude of around zero was already present, the change-over moment can now be reduced by δt, as was already explained above for the holding pressure time controller, so as to thus determine the moment at which an optimum change-over time is present; this not only contributes to producing a high-quality molding but it also helps to reduce the cycle time. It is the goal to accomplish a control to the extent that the change-over time $t_{um}$ is disposed where an extreme value of the derivative of the second order just no longer occurs.

Here, there are also criteria which accelerate the search algorithm, so that it is no longer necessary to visit and examine each individual point of the internal tool pressure course. Because the maximum or minimum, that is, the extreme value Max$(dPwi/dt)^2$, is searched for between the change-over time $t_{um}$ set on the machine and the time $t_m$ at which the first maximum Max (Pwi) of the internal tool pressure occurs in the holding pressure phase C. Usually, a threshold value of a screw position or a fixed moment is indicated as a criterion for the search, from which the search can start. A threshold value of an internal tool pressure or of a hydraulic pressure can also be a criterion. This results in a controller equation either as a function of the time t or of the screw position such as:

$$s = (Min)Max((dPwi/dt)^2 - \text{desired value}) \times \text{amplification factor} \times S.\text{factor.}$$

The S.factor is the scaling factor and is intended for the adjustment to the value scale which is available in the machine as a setting magnitude such as, e.g., screw path, injection volume or time. The value s can assume very large values so that it cannot be utilized directly as setting magnitude. Of the value that was determined only the sign is used and multiplied by a fixedly predetermined small adjustment unit so as to obtain a meaningful adjustment.

Figure 10:
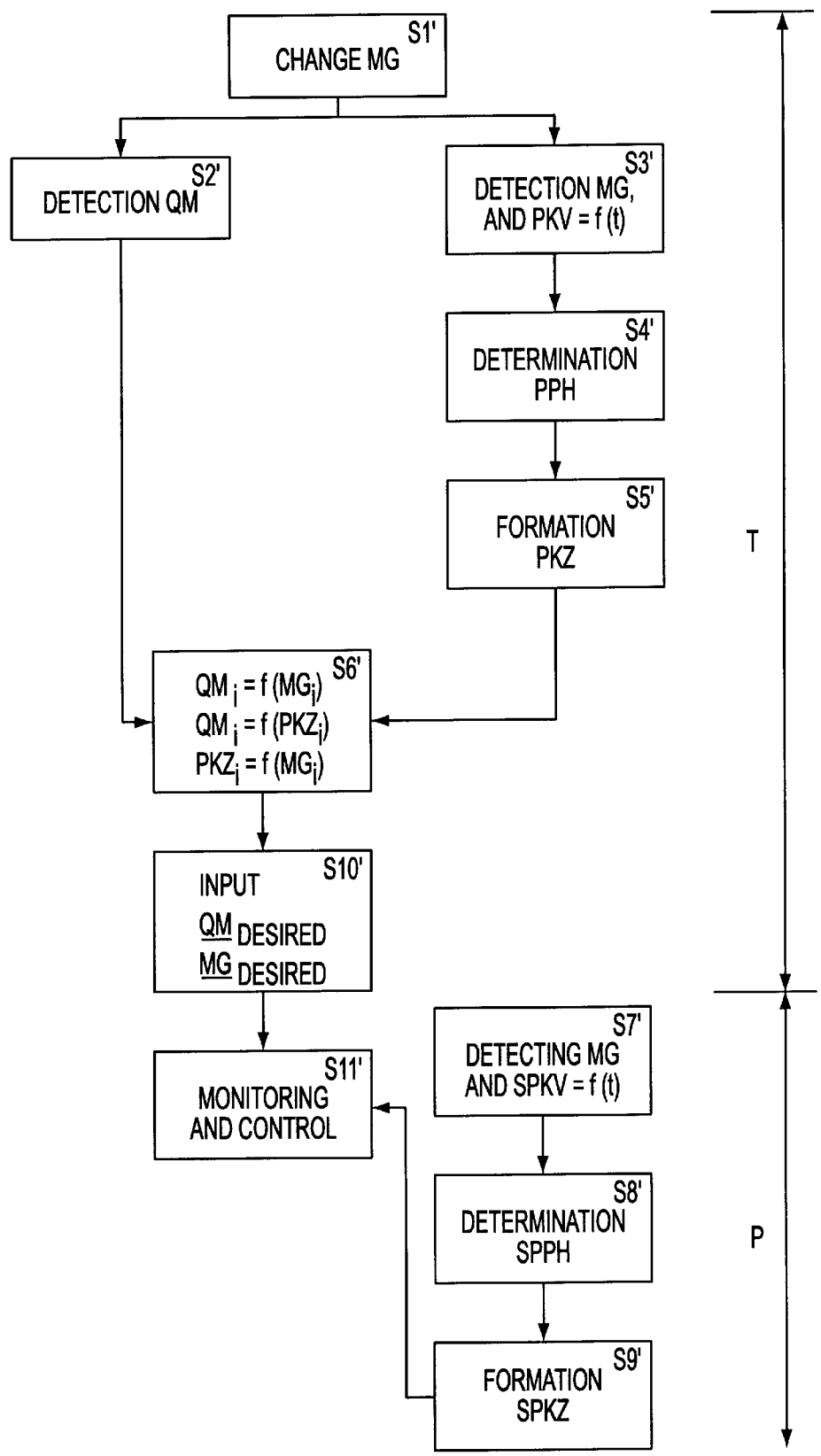
FIG. 10 is a flow chart showing a method sequence with regard to a quality control.

Holding time controller and change-over point controller can be part of a multimagnitude controller for controlling the quality of the features that are produced, as is explained in the older German patent application P 44 34 653.0 and the associated PCT application PCT/DE 95/01345 filed on Sep. 28, 1995. The disclosure content of these applications is herewith also explicitly made the disclosure content of the present application. A short version thereof ensues from FIGS. 9 and 10.

During each process, a plurality of process parameters is determined via sensor means such as, e.g., an internal tool pressure sensor 11 and a temperature sensor 12. But this determination first takes place during a test phase T during which the machine setting magnitudes MG are systematically changed. For each change, the quality features QM of the products that are made as well as the machine setting magnitudes (steps S1', S2', S3') which are set during the process are detected. Process curve courses PKV are detected during a process via means 13. The quality features QM can additionally be entered via input means 14, which quality features can be determined by conventional methods but also directly by the machine.

In step S4', an usually automatic breakdown of the process curve courses into process phases PPH takes place which are determined by the machine itself by way of the signal input. Here, different signals of different process curve courses can be associated with one another to determine meaningful process phases PPH. Within these process phases, the process identifier numbers PKZ are then formed which identify the process phases (step S5'). A connection between machine setting magnitude and quality feature QM can then be determined via these process identifier numbers. Corresponding equations are shown in step S6'. These relationships are determined through the means 15. Usually, neither the quality features nor the machine setting magnitudes are linearly dependent from one another. In step S10', desired values $QM_{desired}$, $MG_{desired}$ are predetermined for the quality features QM and the machine setting magnitudes MG. During the production phase P, the same steps are carried out which already took place during the test phase. Series process curve courses SPKV are determined (step S7'), these are broken down into series process phases SPPH (step S8') and are identified by series process identifier numbers SPKZ (step S9'). By way of these series process identifier numbers, a monitoring and control of the quality of the parts to be produced can be carried out in step S12'.

For this purpose, the relationship determined in the test phase was stored in storage means 16. Then the machine setting magnitudes can be influenced, for example, via the setting arrangement 17, 18. If a difference value QM, PKZ, MG is obtained in a comparator 21, this difference value can be evaluated by controller 19 to the extent that an adjustment control takes place.

Figure 11:
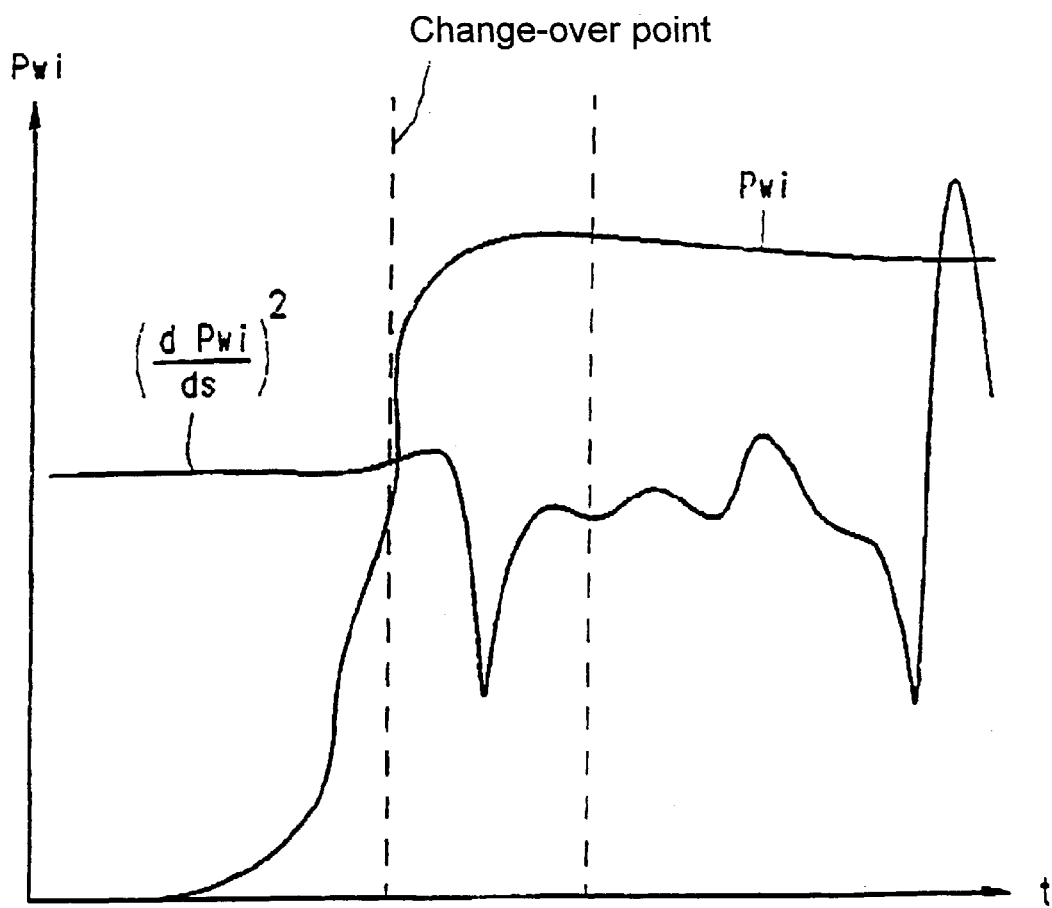
FIG. 11 is a digram showing, according to FIG. 5, a course of the derivative of the internal tool pressure as a function of the path.

FIG. 11 illustrates the determined internal tool pressure as well as its second differential derivative $(d\ Pwi/ds)^2$ as a function of the path s of the conveying means, plotted over the time. In an injection cycle on an injection molding machine, the time domain covers approximately a range of 0.3 sec prior to the change-over to approximately 0.7 sec after the change-over. A correct change-over point is shown at which the second derivative in the time period considered is approximately around zero. If, however, the change-over occurs too late, the second derivative experiences a marked minimum. If, on the other hand, the change-over occurs too early, a difference cannot be found compared to the case of the correct change-over. For this reason, the control takes place such that only a slight decrease of the pressure rise occurs according to a small extreme value of the second derivative, so that a change-over point is accomplished which is as optimal as possible.

It is understood that this description can be subjected to a great variety of modifications, changes and adjustments which are in the range of equivalents with respect to the attached claims.

We claim:

1. A method of controlling a course of an internal tool pressure on a cyclically operating machine, comprising the steps of:
   a) filling of a mold cavity with a conveyable material by a conveying means,
   b) applying a pressure to compress the conveyed material while the filling of the mold cavity continues, c) applying a holding pressure during a molding of a product in the mold cavity, d) reducing the pressure and removing the product, e) detecting the course of the internal tool pressure (Pwi) at least as a function of time (t), which course occurs as a result of the pressure in steps a) to d), f) differentiating the course of the internal tool pressure (Pwi) at least twice as a function of time (t) to determine a second order derivative, g) by way of the derivative determined in step (f), checking the course of the internal tool pressure (Pwi) for presence of an extreme value $(max(dPwi/dt)^2)$ of the second order derivative at least in a transition region between regions of the internal tool pressure courses resulting from steps b) to c), h) changing a change-over time $(t_{um})$ of a transition between steps b) and c) when an extreme value of the second order derivative occurs in step g), and i) repeating steps a) to h) until the second order derivative no longer shows an extreme value in the transition region.

2. The method according to claim 1, including:

j) advancing the change-over time $(t_{um})$ when the second order derivative is near zero in step g), k) repeating steps a) to g) until the second order derivative has an extreme value in a region of the change-over time, and performing steps h) and i) by delaying the change-over time $(t_{um})$ slightly until an extreme value just no longer occurs.

3. The method according to claim 1, including continuously detecting the course of the internal tool pressure (Pwi) and controlling the change-over time in a closed control loop to a value so that the extreme value just no longer occurs.

4. The method according to claim 1, including determining the extreme value $(Max(dPwi/dt)^2)$ between the change-over time $(t_{um})$ set on the machine and a time $(t_m)$ at which a first maximum (Max(Pwi)) of the internal tool pressure appears while the holding pressure is applied in step c).

5. The method according to claim 1, further including providing at least one of the following criteria as a change-over criterion set on the machine between step b) and c):

1) reaching a predetermined path of the conveying means,
2) reaching a predetermined moment,
3) reaching a predetermined internal tool pressure, and
4) reaching a predetermined hydraulic pressure, on a basis of which the method steps are carried out.

6. A method of controlling a course of an internal tool pressure on a cyclically operating machine, comprising the steps of:

a) filling of a mold cavity with a conveyable material by a conveying means, b) applying a pressure to compress the conveyed material while the filling of the mold cavity continues, c) applying a holding pressure during a molding of a product in the mold cavity, d) reducing the pressure and removing the product, e) detecting the course of the internal tool pressure (Pwi) at least as a function of a path traversed by the conveying means, which course occurs as a result of the pressure in steps a) to d), f) differentiating the course of the internal tool pressure (Pwi) at least twice as a function of the path to determine a second order derivative, g) by way of the derivative determined in step (f), checking the course of the internal tool pressure (Pwi) for the presence of an extreme value $(Max(dPwi/ds)^2)$ of the second order derivative at least in a transition region between the internal tool pressure courses resulting from steps b) to c), h) changing a change-over point of the path traversed by the conveying means up to a transition between steps b) and c) when an extreme value of the second order derivative occurs, and i) repeating steps a) to h) until the second order derivative no longer shows an extreme value in the transition region.

7. The method according to claim 6 including:

j) shortening the path traversed by the conveying means up to the change-over point when the second order derivative is almost zero in step g), k) repeating steps a) to g) until the second order derivative has an extreme value in a region of the change-over point, and performing steps h) and i) by extending slightly the path traversed by the conveying means until an extreme value just no longer occurs.

8. The method according to claim 6 including continuously detecting the course of the internal tool pressure (Pwi) and controlling the path up to the change-over point in a closed control loop to a value so that a maximum just no longer occurs.

9. The method according to claim 6, including providing at least one of the following criteria as a change-over criterion set on the machine:

1) reaching a predetermined path of the conveying means,
2) reaching a predetermined moment,
3) reaching a predetermined internal tool pressure, and
4) reaching a predetermined hydraulic pressure, on a basis of which the method steps are carried out.

10. A method of controlling a course of an internal tool pressure on a cyclically operating machine, comprising the steps of:

a) filling of a mold cavity with a conveyable material by a conveying means, b) applying a pressure to compress the conveyed material while the filling of the mold cavity continues, c) applying a holding pressure during a molding of the product in the mold cavity, d) reducing the pressure and removing the product, e) detecting the course of the internal tool pressure (Pwi) at least as a function of time (t), which course occurs as a result of the pressure in steps a) to d), f) differentiating the course of the internal tool pressure (Pwi) at least one time as a function of the time (t), g) by way of the derivative determined in step (f), checking the course of the internal tool pressure (Pwi) for presence of a constant slope at least in regions of the internal tool pressure courses resulting from steps c) to d), h) when a non-constant descending course occurs in step g), changing a holding pressure time $(t_n)$ up to a transition between steps c) and d), i) repeating steps a) to h) until a constantly descending course appears in step f).

11. The method according to claim 10, wherein step g) includes:

selecting at least one point from a plurality of points in regions of the course of the internal tool pressure resulting from steps c) and d), checking in regions upstream and downstream of each said point whether there is no constant slope, in an absence of a constant slope, extending the holding pressure time ($t_n$), measured as of a transition between steps b) and c), and repeating steps a) to g) until the checking results in a constant slope.

12. The method according to claim 10, wherein step g) includes:

selecting a plurality of points in regions of the course of the internal tool pressure (Pwi) resulting from steps c) and d), checking in regions upstream and downstream of each said point whether there is no constant slope, in a presence of a constant slope in step g), shortening the holding pressure time ($t_n$), measured as of a transition between steps b) and c), repeating steps a) to g) until the checking does not result in a constant slope, and performing steps h) and i) by slightly extending the holding pressure time ($t_n$) until a constant slope is just present.

13. The method according to claim 10, wherein the detecting step includes continuously detecting the course of the internal tool pressure (Pwi) and step h) includes controlling the holding pressure time ($t_n$) in a closed control loop to a value so that a constant ascending slope just still occurs.

14. The method according to claim 10, wherein the checking according to step g) includes differentiating the course of the internal tool pressure (Pwi) once as a function of the time to form a differential curve, determining a first value (S1) of the differential curve in a region upstream of the holding pressure time ($t_n$) and a second value (S2) of the differential curve in a region downstream of the point, and checking whether the first value (S1) divided by the second value (S2) is approximately 1.

15. The method according to claim 10, including using a digital signal representing an end of the holding pressure as a starting point for the checking according to step g).

16. The method according to claim 10, wherein the machine is a hydraulic press and the method includes using as a starting point for the checking according to step g) a point at which a hydraulic pressure of the press drops from a high level to a low level.

17. The method according to claim 14, wherein the holding pressure time ($t_n$) is controlled according to a controller equation as follows:

$$\Delta tn = -(S1/S2 - \text{desired value}) \times \text{amplification factor.}$$

18. A method according to claim 10, characterized in that the method is carried out on a plastics injection molding machine on which steps a) and b) are velocity-controlled and c) and d) are pressure-controlled.

\* \* \* \* \*